(12) United States Patent
Petruchik

(10) Patent No.: US 6,469,757 B1
(45) Date of Patent: Oct. 22, 2002

(54) SELECTIVE REMOVAL OF LIGHT MODULATING LAYER FROM ELECTRICALLY CONDUCTIVE LAYER OF LIQUID CRYSTAL DISPLAY SUBSTRATE

(75) Inventor: Dwight J. Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 263 days.

(21) Appl. No.: 09/628,082

(22) Filed: Jul. 28, 2000

(51) Int. Cl.⁷ ............................................. G02F 1/1334
(52) U.S. Cl. .............................. 349/86; 349/88; 349/89; 349/90; 445/23; 445/24
(58) Field of Search .............................. 349/86, 88, 89, 349/90; 445/23, 24, 66

(56) References Cited

U.S. PATENT DOCUMENTS

| | | |
|---|---|---|
| 4,435,047 A | 3/1984 | Fergason |
| 4,685,771 A | 8/1987 | West et al. |
| 5,116,528 A | 5/1992 | Mullen et al. |
| 5,437,811 A | 8/1995 | Doane et al. |
| 5,583,670 A | 12/1996 | Iijima et al. |

*Primary Examiner*—Toan Ton
*Assistant Examiner*—Hoan Nguyen
(74) *Attorney, Agent, or Firm*—Raymond L. Owens

(57) ABSTRACT

A process selectively removes a light modulating layer containing a liquid crystalline material dispersed in a polymeric binder from the electrically conductive layer of a liquid crystal display web. The provided web comprises a flexible substrate, an electrically conducting layer disposed on the substrate, and a light modulating layer disposed on the electrically conductive layer. The light modulating layer inclues a liquid crystalline material dispersed in a polymeric binder and has an upper surface. The web is transported at a controlled rate of speed from a first station to a second station that is situated at a selected distance from the first station. At the first station, a solvent effective for softening the light modulating layer is applied at a controlled rate to a selected portion of the upper surface, thereby forming a selected softened portion of the light modulating layer. At the second station, the selected softened portion of the light modulating layer is selectively removed from the electrically conductive layer on the substrate.

17 Claims, 1 Drawing Sheet

SELECTIVE REMOVAL OF LIGHT MODULATING LAYER FROM ELECTRICALLY CONDUCTIVE LAYER OF LIQUID CRYSTAL DISPLAY SUBSTRATE

CROSS REFERENCE TO RELATED APPLICATION

Reference is made to commonly-assigned U.S. patent application Ser. No. 09/627,802 filed concurrently herewith, entitled "Process for Laminating Electrically Addressable Display" by Dwight J. Petruchik, the disclosure of which is incorporated herein.

1. Field of the Invention

The present invention relates to electrically addressable displays and, more particularly, to a process for selectively removing a light modulating layer containing a liquid crystalline material in a polymeric binder from the electrically conductive layer of a liquid crystal display substrate.

2. Background of the Invention

Liquid crystalline materials, because they can be manipulated between light scattering and light transmissive modes in response to applied electric fields, find use in a variety of display devices. These materials, which may have either positive or negative dielectric anisotropy, are generally classified as nematic or smectic. A particular type of nematic liquid crystals, referred to as chiral nematic, has the ability to selectively reflect one component of circularly polarized light. In the chiral nematic phase, which is synonymous with the cholesteric phase, chiral molecules form very thin layers of aligned molecules, the alignment in one layer being at a slight angle from that in an adjacent layer, and the alignment in a stack of such layers forming a continuous helical pattern.

Many known liquid crystal display devices make use of liquid crystalline materials dispersed in polymeric matrices. For example, U.S. Pat. No. 4,435,047, the disclosure of which is incorporated herein by reference, describes a liquid crystalline material, preferably nematic, of positive dielectric anisotropy dispersed in a polymeric encapsulating medium such as polyvinyl alcohol. Also, U.S. Pat. No. 4,685,771, the disclosure of which is incorporated herein by reference, describes a light-modulating liquid crystal display material that contains liquid crystalline microdroplets dispersed in a thermoplastic resin, the microdroplets being of a size effective to scatter incident light when the optical axes of the microdroplets are randomly aligned. U.S. Pat. No. 5,116,528, the disclosure of which is incorporated herein by reference, describes a light modulating material that includes a liquid crystalline material dispersed in a cross-linked isocyanate material, preferably a polyacrylic urethane. Also, U.S. Pat. No. 5,583,670, the disclosure of which is incorporated herein by reference, describes an information recording layer in which a liquid crystal phase is dispersed in an acrylic or methacrylic resin having a molecular weight of 25,000 to 100,000.

PCT/WTO 97/04398, entitled ELECTRONIC BOOK WITH MULTIPLE DISPLAY IMAGES, discloses the assembly of multiple electronically written display sheets into a "book." The reference describes prior art techniques for forming thin, electronically written pages, including flexible sheets, image modulating material formed from a bi-stable liquid crystal system, thin metallic conductor lines on each page, and transparent conducting polymers formed over the light modulating material.

Co-pending, commonly assigned U.S. application Ser. No. 09/379,776, filed Aug. 24, 1999 for FORMING A DISPLAY HAVING CONDUCTIVE IMAGE AREAS OVER A LIGHT MODULATING LAYER, the disclosure of which is incorporated herein by reference, describes a method for forming a display on a transparent substrate on which is formed a transparent, electrically conductive coating. A light modulating layer including liquid crystalline material in a polymer binder is formed over the electrically conductive layer, and an opaque conductive material is deposited in an imagewise pattern over the light modulating layer in the form of viewable and conductive images. The light modulating layer is effective in a first condition to prevent the viewing of the viewable and conductive images and in a second condition to permit the viewing of the viewable and conductive images. Electrical connections enable an electrical field to be applied across selected ones of the viewable and conductive images and the transparent electrically conductive layer to cause the light modulating layer underlying the selected images to change from the first condition to the second condition and thereby present the images for viewing by a viewer.

In the fabrication of a liquid crystal display as just described, a transparent, electrically conductive layer is formed on the substrate, followed by the formation of the light modulating layer comprising liquid crystalline material in a polymeric binder on the conductive layer.

SUMMARY OF THE INVENTION

The present invention is directed to a process for selectively removing a light modulating layer containing a liquid crystalline material dispersed in a polymeric binder from the electrically conductive layer of a liquid crystal display web. The provided web includes a flexible substrate, an electrically conducting layer disposed on the substrate, and a light modulating layer disposed on the electrically conductive layer. The light modulating layer comprises a liquid crystalline material dispersed in a polymeric binder and has an upper surface.

In accordance with the invention, the web is transported at a controlled rate of speed from a first station to a second station that is situated at a selected distance from the first station. At the first station, a solvent effective for softening the light modulating layer is applied at a controlled rate to a selected portion of the upper surface, thereby forming a selected softened portion of the light modulating layer. At the second station, the selected softened portion of the light modulating layer is selectively removed from the electrically conductive layer on the substrate.

In making liquid crystal displays, it is frequently necessary to make electrical connections to the underlying conductive layer, a task that is facilitated by the process of the present invention.

DETAILED DESCRIPTION OF THE INVENTION

Figure 1:
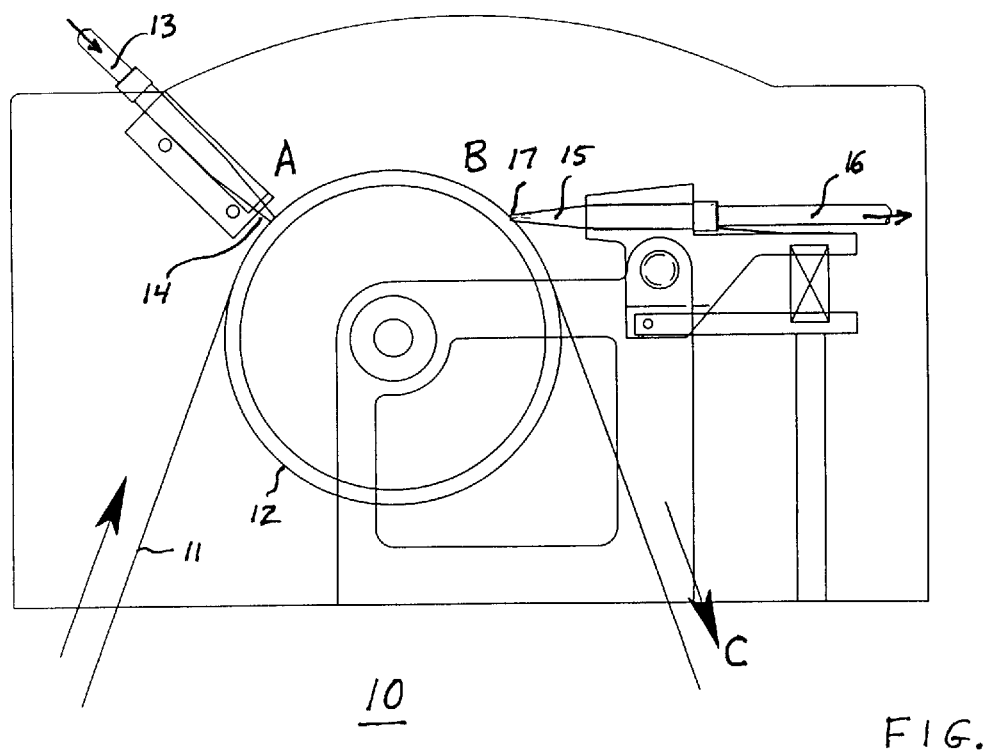
FIG. 1 is a schematic illustration of an apparatus for carrying out the process of the invention.
Figure 2:
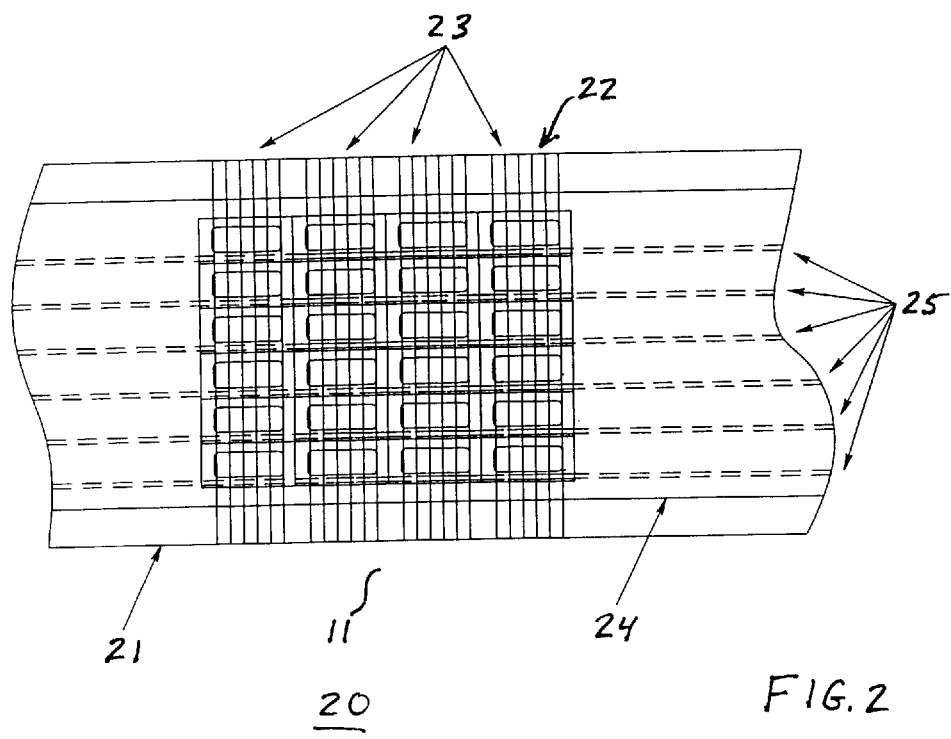
FIG. 2 is depicts a liquid crystal display web from which portions of the light modulating layer have been selectively removed in accordance with the present invention.

In FIG. 1 is depicted an apparatus 10 for selectively removing a light modulating layer containing a liquid crystalline material in a polymeric binder from the electrically conductive layer of a liquid crystal display web 11, which comprises a flexible substrate on which the electrically conducting layer and the light modulating layer are formed. (These components of web 11 are shown in FIG. 2.) Using a rotating drum 12, web 11 is transported at a controlled rate of speed from a roll (not shown) to a first station "A", at which is located a solvent inlet 13, a delivery nozzle 14, and a metering pump (not shown) for controlling the amount and application rate of a solvent effective for softening a selected portion of the light modulating layer of web 11.

The selected softened portion of the light modulating layer is transported by drum 12 to a second station "B", at which is located a skiving device 15 for removing the softened portion of the modulating layer from the underlying conductive layer of web 11. Skiving device 15 preferably includes an interior channel 16 connected to a vacuum source (not shown), which enables the skived softened portion of the modulating layer and associated solvent to be removed from station "B". Prior to transport to a take-up roll (not shown), web 11 may proceed to an optional third station "C" that includes a drying device (not shown) for removing any residual solvent. Preferably, however, the amount of solvent dispensed at first station "A" is effectively controlled by the metering pump and delivery nozzle 14 so that web 11 is substantially dry as it departs second station "B".

It is important that the selected softened portion of the light modulating layer be cleanly and substantially removed from the underlying conductive layer without causing damage to that layer, which preferably is a transparent layer of indium-tin oxide (ITO). Thus skiving device 15, which includes a pointed tip 17, must be formed from a material such as glass or plastic that is sufficiently hard to remove the softened light modulating layer but not hard enough to scratch the conductive layer. Preferably, skiving device 15 is made of a plastic such as polyethylene or polypropylene. For use as skiving device 15 as well as solvent delivery nozzle 14, commercially available pipettes such as the low density polyethylene (LDPE) transfer pipettes sold by Aldrich Chemical Company are convenient.

The flexible substrate of web 11 is preferably formed from a material selected from the group consisting of polyesters, polyolefins, polycarbonates, vinyl resins, acrylic resins, and methacrylic resins, polyesters being particularly preferable. As already noted, the electrically conductive layer preferably comprises indium-tin oxide (ITO). The light modulating layer of web 11 includes a liquid crystalline material, preferably cholesteric, dispersed in a polymeric binder preferably selected from the group consisting of deionized gelatin, polyolefins, polystyrenes, acrylic resins, methacrylic resins, urethane resins, and epoxy resins. Depending on the binder selected, the solvent applied at first station "A" for softening the light modulating layer is selected from the group consisting of water, chloroform, dichloromethane, ethyl acetate, toluene, cyclohexanone, dioxane, and tetrahydrofuran. A preferred binder for the light modulating layer is deionized gelatin, which can be softened by water. If the gelatin contains a cross-linking agent, the water employed as the solvent may beneficially include a small amount of Chlorox™ solution.

FIG. 2 depicts a structure 20 obtained by the process of the present invention, as described in the discussion of FIG. 1. Liquid crystal display web 11 comprises a flexible substrate 21 bearing an ITO electrically conductive layer 22, which is patterned by laser etching into an array of columns 23. A light modulating layer 24 comprising, preferably, a cholesteric liquid crystalline material dispersed in deionized gelatin is formed on patterned ITO layer 22, and linear portions 25 of layer 24 are selectively removed from underlying ITO layer 22 after softening by water. The pattern of selectively removed portions 25 of light modulating layer 24 in structure 24 can be conveniently achieved using a plurality of solvent application and skiving stations "A" and "B", respectively, across the width of web 11.

The invention has been described in detail for the purpose of illustration, but it is to be understood that such detail is solely for that purpose, and variations can be made by those skilled in the art without departing from the spirit and scope of the invention, which is defined by the following claims.

PARTS LIST 10 apparatus
11 web
12 drum
13 solvent inlet
14 delivery nozzle
15 skiving device
16 channel
17 pointed tip
20 structure
21 substrate
22 conductive layer
23 columns
24 layer
25 linear portions

What is claimed is:

1. A process for selectively removing a light modulating layer containing a liquid crystalline material in a polymeric binder from the electrically conductive layer of a liquid crystal display web, the process comprising:

providing a liquid crystal display web comprising a flexible substrate, an electrically conducting layer disposed on the substrate, and a light modulating layer disposed on the electrically conductive layer, the light modulating layer including a liquid crystalline material dispersed in a polymeric binder and having an upper surface;

transporting the web at a controlled rate of speed from a first station to a second station situated at a selected distance from the first station;

at the first station, applying to a selected portion of the upper surface at a controlled rate of application a solvent effective for softening the light modulating layer, thereby forming a selected softened portion of the light modulating layer; and at the second station, selectively removing the selected softened portion of the light modulating layer from the electrically conductive layer of the substrate.

2. The process of claim 1 wherein the first station comprises a solvent delivery nozzle and a metering pump for controlling the rate of application of the solvent.

3. The process of claim 1 wherein the second station comprises a skiving device for selectively removing the softened portion of the light modulating layer from the electrically conductive layer of the substrate.

4. The process of claim 3 wherein the skiving device is in the form of a pipette.

5. The process of claim 3 wherein the skiving device is formed from plastic or glass.

6. The process of claim 5 wherein the skiving device is formed from plastic, the plastic comprising polyethylene or polypropylene.

7. The process of claim 3 wherein the second station further comprises a vacuum source for transporting selectively removed softened portion of the light modulating layer away from the second station.

8. The process of claim 7 wherein the skiving device comprises an interior channel connected to the vacuum source.

9. The process of claim 1 wherein the transporting the web is carried out using a drum.

10. The process of claim 1 wherein the rate of speed of transporting the web and the rate of application of the solvent at the first station are controlled to provide the selected softened portion of the light modulating layer at the second station.

11. The process of claim 1 further comprising:
    transporting the web from the second station to a third station, the station comprising a drying device.

12. The process of claim 1 wherein the liquid crystalline material is a cholesteric material.

13. The process of claim 1 wherein the electrically conductive layer comprises indium-tin oxide.

14. The process of claim 1 wherein the flexible substrate is formed from a material selected from the group consisting of polyesters, polyolefins, polycarbonates, vinyl resins, acrylic resins, and methacrylic resins.

15. The process of claim 1 wherein the polymeric binder is selected from the group consisting of deionized gelatin, polyolefins, polystyrenes, acrylic resins, methacrylic resins, urethane resins, and epoxy resins.

16. The process of claim 1 wherein the solvent is selected from the group consisting of water, chloroform, dichloromethane, ethyl acetate, toluene, cyclohexanone, dioxane, and tetrahydrofuran.

17. The process of claim 1 wherein the polymeric binder is deionized gelatin and the solvent is water.

\* \* \* \* \*